United States Patent

Hammond

[15] 3,672,691

[45] June 27, 1972

[54] MEANS FOR OPERATING RELEASABLE TOOL CHUCKS

[72] Inventor: Earl J. Hammond, Frankenmuth, Mich.

[73] Assignee: Houdaille Industries, Inc., Buffalo, N.Y.

[22] Filed: June 2, 1970

[21] Appl. No.: 42,766

[52] U.S. Cl..............................279/1 TS, 29/26, 90/11 D, 408/35, 408/241
[51] Int. Cl................B23b 29/12, B23b 31/28, B23b 31/30
[58] Field of Search.............................279/1 M, 4, 1 K, 1 TS; 90/11 A, 11 D; 408/35, 241; 29/26

[56] References Cited

UNITED STATES PATENTS 2,716,555   8/1955   Rowe.....................................279/1 K
3,028,770   4/1962   Pittwood...................................29/26

Primary Examiner—Francis S. Husar
Attorney—Hill, Sherman, Meroni, Gross & Simpson

[57] ABSTRACT

A tool holder or chuck of the type which is releasable from a tool by relative rotation of a releasing member is adapted to be selectively coupled with a non-rotating member while the tool driving spindle continues rotating uninterruptedly, thereby releasing the clutch coupling to release the tool. Especially suitable for multi-operation machines, whereby various tools can be cyclically picked up from and returned to a rack in automatic operation of the machine to perform sequentially on a work piece.

13 Claims, 6 Drawing Figures

PATENTED JUN 27 1972  3,672,691

INVENTOR.
Earl J. Hammond
BY _____ ATTORNEYS

MEANS FOR OPERATING RELEASABLE TOOL CHUCKS

This invention relates to means for operating releasable tool holders or chucks and is more particularly concerned with elimination of manual manipulation of tool holders to effect tool changes.

In certain machining operations such as milling or drilling wherein metal is removed from a work piece by a rotating tool, it is often necessary or desirable to use tools of different sizes or configurations or having different cutting characteristics to achieve a desired result on the work piece. For example, it may be desired to use a center drill, a drill, a counterbore, a reamer, a countersink, a tap, or other metal cutting or finishing tool in a preferred sequential or cyclical operation according to the nature of the work to be done. While such sequential operations are well known, they are generally accomplished by having separate tool spindles which are brought successively into operative position with respect to the work, or a single spindle may be employed with respect to which the several tools are successively releasably coupled as by means of a tool holder or chuck.

One such chuck designed to enable quick tool changes is described in U.S. Pat. No. 3,498,624, issued Mar. 3, 1970, the disclosure of which to whatever extent necessary is incorporated herein by reference as representative of the class of tool holders with which the present invention is especially useful. In such a chuck device, the shank of a tool holder is adapted to be releasably retained within a chuck socket by means of locking dogs which are adapted to be released by cam actuated mechanism responsive to the relative rotation of a housing sleeve or collar so that the tool holder shank can drop out of the chuck socket. Clutching engagement of a tool holder shank is effected automatically by trigger-actuated mechanism within the chuck responsive to thrusting of the tool shank into the chuck socket.

Effecting placement or release of a tool holder with respect to such a chuck while the chuck is in continuous rotation with a driving spindle presents certain obvious hazards of liability of injury where it is attempted to accomplish these changes manually, so that it has been generally necessary to stop the spindle rotation or at least slow it down considerably from operating speed, thus considerably reducing machine operating time efficiency.

According to the present invention, the foregoing and other disadvantages, shortcomings, inefficiencies and problems are overcome by providing new and improved means for operating releasable tool chucks while continuously rotating with the driving spindle at uninterrupted speed.

An important object of the present invention is to provide means for automatically changing from one tool to another during the course of sequential machining operations without stopping the machine spindle.

Another object of the invention is to provide new and improved means for operating releasable tool chucks.

Another object of the invention is to provide new and improved means for controlling the operation of a relatively rotatable housing sleeve of a tool holder chuck.

Still another object of the invention is to provide a novel method of and means for operating a tool holder chuck for performing a sequence of operations with different tools.

Other objects, features and advantages of the invention will be readily apparent from the following description of certain preferred embodiments thereof, taken in conjunction with the accompanying drawing, although variations and modifications may be effected without departing from the spirit and scope of the novel concepts embodied in the disclosure, and in which.

Figure 1:
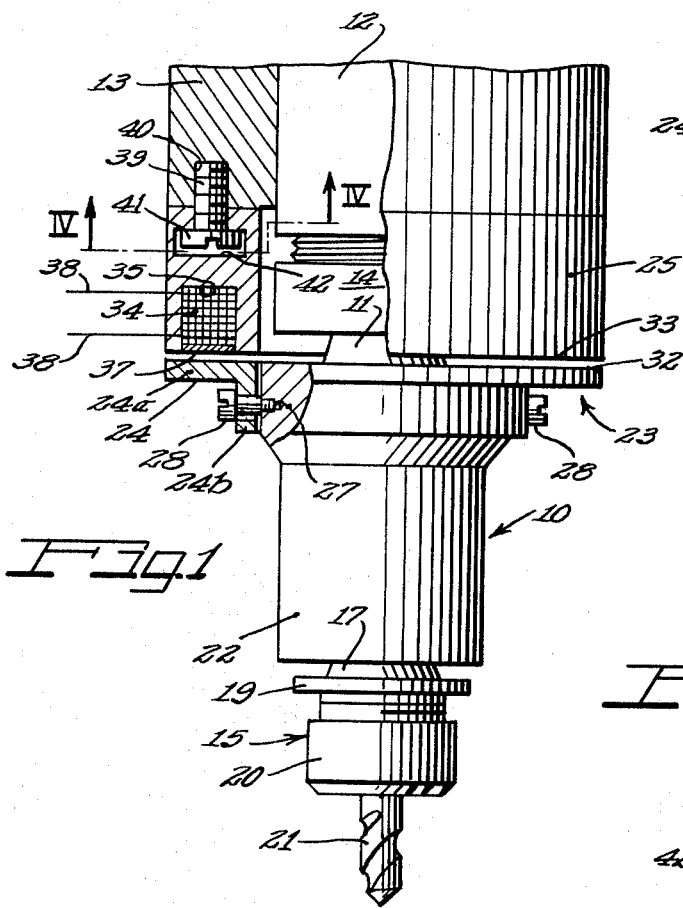
FIG. 1 is a fragmentary elevational view, partially in section, showing a machine spindle carrying corotatably a chuck device releasably supporting a tool holder.

On reference to FIG. 1, a device 10, by way of example embodying the operating mechanism of the device disclosed in the aforementioned U.S. Pat. 3,498,624, may be variously identified as a tool holder, tool changer, and the like, but will be herein referred to as a chuck. On the body of the chuck 10 is an axial tapered shank 11 which is coaxially and corotatively fixed operatively to the receiving end portion of a rotary machine spindle 12 in operation continuously or intermittently driven at any desired speed within permissible limits and by any preferred driving means of a metal working machine having associated therewith a work piece holder. Journalling the spindle 12 is a non-rotary tubular housing part 13 having an end about the chuck-receiving end portion of the spindle 12 and spaced from the chuck 10 and the spindle end at least sufficiently for manipulating access clearance to a spindle-end-carried device such as chucking nut 14 to enable attachment and removal of the chuck.

Figure 6:
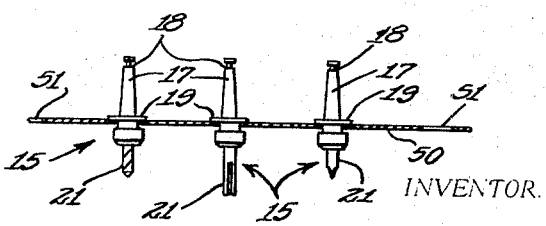
FIG. 6 is a fragmentary sectional elevational view of a tool supporting rack or storage magazine.

Construction and operation of the chuck 10 is such as to receive coaxially and corotatively a tool adapter or holder 15 provided with a coaxial tapered shank 17 receptive in a complementary socket within the chuck 10 and provided at its distal end portion with a locking groove 18 (FIG. 6) within which releasable locking dogs of the chuck are engageable. About the base end of the shank 17 a lateral annular flange 19 is provided on the body of the tool holder and of a larger diameter than a chucking nut 20 by which any selected metal working cutting tool 21 such as a center drill, drill, counterbore, reamer, countersink, tap, and the like, is adapted to be releasably secured corotatively within and projecting from the tool holder.

As taught by said U.S. Pat. No. 3,498,624, retentive assembly of the holder shank 17 within the chuck 10 is accomplished by the simple act of inserting the holder shank fully into the socket within the chuck whereupon locking dogs are automatically released by the holder shank to engage retainingly within the locking groove 18. When it is desired to release the tool holder 15 from the chuck 10, relative rotation is effected between a normally corotative outer housing collar or sleeve 22 of the chuck 10 and the body of the chuck whereby internal mechanism of the chuck including cam structure is operated to release the locking dogs from the groove 18 of the holder shank and effect ejection of the tool holder 15.

Although operation of the chuck 10 to effect release of the holder 15 may be effected by manually grasping the housing sleeve 22, a more efficient manner of accomplishing this result is provided for according to the present invention to enable changing of tools without halting or diminishing rotation of the chuck 10 or the machine spindle 12 for rapid tool changes and performance. Mechanism for this purpose may take various mechanical forms.

Figure 2:
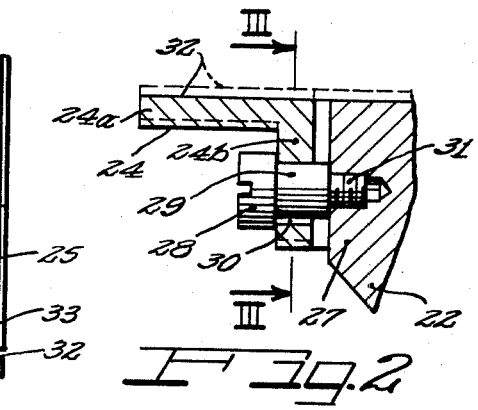
FIG. 2 is an enlarged fragmentary sectional view showing a detail of FIG. 1.
Figure 3:
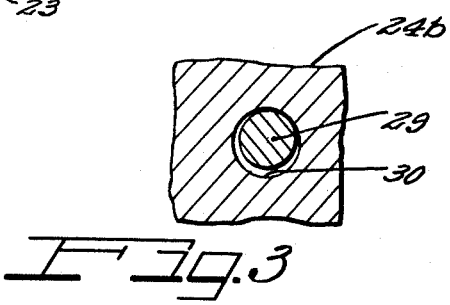
FIG. 3 is a fragmentary sectional detail view taken substantially on the line III—III of FIG. 2.

One desirable form of mechanism for operating the chuck 10 to release the tool holder 15 comprises selectively operable coupling means 23 including a member 24 mounted on the end portion of the sleeve 22 nearest a cooperative coupling part 25 mounted on the housing part 13. In this instance the coupling means function as a normally inactive friction clutch wherein the members 24 and 25 are separated from one another but are clutchingly engageable by relative axial movement of one of the members or at least a part thereof toward and into engagement with the other of the members. In the arrangement shown in FIGS. 1–3, the sleeve-carried member 24 is mounted for movement toward the housing-carried member 25. For this purpose, the member 24 comprises an annular flange of generally L-shape radial cross section having a radially outwardly extending portion 24a and an axially or longitudinally extending portion 24b which freely concentrically encircles a preferably enlarged supporting end collar portion 27 of the housing sleeve 22 and is secured thereto in a manner to enable limited axial relative movement by means of shoulder screws 28 having respective shank body portions 29 extending through larger diameter respective holes 30 in the flange portion 24b and with a threaded portion 31 of each screw shank secured in a suitably tapped bore in the housing sleeve portion 27. By having the flange member 24 constructed of ferromagnetic material it is adapted to be drawn toward the housing-carried member 25 serving as an electromagnet, so that a relatively wide friction surface 32 on the flange portion 24a will be selectively brought into frictional clutching engagement with a confronting normally spaced friction clutch surface 33 of at least complementary width on the member 25. For this purpose, the range of movement permitted by the oversized screw passage holes 30 is at least equal to and desirably slightly greater than the normal gap between the unengaged surfaces 32 and 33 permitting normal free rotation of the surface 32 with respect to the surface 33.

For electromagnetic purposes, the housing-carried member 25 carries an annular selectively operable electromagnet coil 34 mounted within a suitable annular groove 35 in the surface 33, with a protective wearing surface 37 enclosing the coil within the groove and lying generally flush with the clutch surface 33. Electrical lead wires 38 connect the coil 34 with any preferred switching or signalling means for commanding the coil to be energized and effect operation of the friction clutch to perform a tool releasing operation. Such signalling and operation of the clutch may be effected as part of a program in the case of machines of the class broadly referred to as numerically controlled or tape controlled machines, by manual switching operation on the part of the machine operator, by automatic position or change of position of the machine spindle with reference to another member, or by any other suitable means suggested or dictated by the nature of the machine being used and the work piece being machined.

Figure 4:
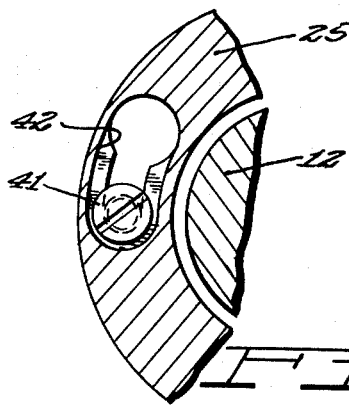
FIG. 4 is a fragmentary sectional detail view taken substantially on the line IV—IV of FIG. 1.
Figure 5:
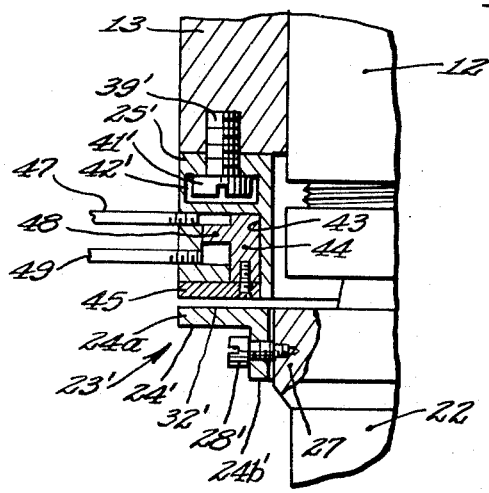
FIG. 5 is a fragmentary sectional elevational view showing a modification.

Construction of the coupling member 25 is such that it may be mounted to an existing spindle housing and may be removed as desired. To this end, the member 25 is constructed as a ring of an inside diameter larger than the diameter of the adjacent end portion of the spindle 12 and the clutching nut 14 to avoid any interference with free rotation of the spindle. For attachment of the member 25 concentrically relative to the spindle, and in a manner to enable easy assembly with the end of the housing portion 13 and easy removal when it is desired to gain access to the clutching nut 14, suitable means are provided such as a bayonet connection. To this end a plurality of screws 39 are threadedly engaged at suitable circumferentially spaced intervals in tapped holes 40 in the end face of the housing portion 13 with their heads 41 suitably spaced from the housing end to be received in respective bayonet slot clearances 42 (FIGS. 1 and 4) in the end portion of the member 25 which is abuttingly engaged against the end of the housing. It will be observed that the screw shank receiving narrow portions of the bayonet slots are directed in the circumferential direction of torque thrust when the friction clutch is engaged while the spindle is running.

Where instead of electromagnetic operation of the clutch 23, hydraulic or pneumatic operation or even manual operation is preferred, a clutching piston arrangement such as depicted in FIG. 5 may be employed. In this construction the several parts are generally similar to parts already described as indicated by primed reference numerals insofar as the friction clutch assembly is concerned. In this instance, the coupling clutch member 25' has an annular cylinder groove 43 within which a piston 44 is reciprocably mounted to move outwardly under fluid pressure to drive a friction surface ring 45 against the friction surface 32' of the coupling ring member 24'. Fluid pressure to drive the piston 44 outwardly is delivered through a pressure duct 47 to act on a piston flange 48 while piston returning or retracting pressure is applied through a duct 49 to act on the opposite side of the piston flange.

Automatic sequential tool changing in a cycle of machine operation is facilitated by the mechanical tool releasing means provided by the present invention. For example, having reference to FIG. 6, a plurality of the tool holders carrying respective ones of the tools 21 to perform various cutting functions may be carried on a storage or magazine rack 50 having respective spaced holes 51 therein to receive the clutching nut portions of the holders therethrough whereby the respective radial flanges 19 of the holders rest upon the rack. In a cycle of operation, the spindle 12 moves into registration with a vacant holder receiving hole 51 of the rack 50, the clutch 23 is operated to effect the relative releasing action within the clutch device 10 whereby the holder 15 then carried by the clutch device is ejected and stored on the rack 50. Then the spindle is moved with its now-emptied chuck 10 into alignment with one of the other selected tools 15 on the rack 50 and moved to engage the shank 17 of the selected tool holder within the socket of the chuck 10 until such shank is automatically locked in the chuck, whereupon the replacement tool holder is picked up from the rack and moved with the spindle to the work piece upon which a further operation is to be effected. Return of the tool holders to the rack 50 and selection of tool holders therefrom may be effected in a programmed sequence in a high speed automatic continuously running metal working machine.

It will be understood that variations and modifications may be effected without departing from the spirit and scope of the novel concepts of this invention.

I claim as my invention:

1. In mechanical means enabling operation of a releasing member which is relatively rotatably mounted on a tool holding chuck corotatively supported by a rotary machine spindle:
    first axially facing coupling means corotative with said releasing member; and
    second complementary coupling means normally axially separated from said first coupling means and operative on being axially shiftably coupled therewith to effect relative rotation between said releasing member and the chuck.

2. Mechanical means according to claim 1, in which said first and second coupling means have respective confronting annular friction clutch surfaces concentric with the spindle normally spaced apart and selectively interengageable.

3. Mechanical means according to claim 2, including electromagnetic means for effecting clutching interengagement between said surfaces.

4. Mechanical means according to claim 2, including fluid operated means for effecting interengagement of said clutch surfaces.

5. Mechanical means according to claim 1, in which said first coupling means comprise an angular flange encircling and carried by said releasing member.

6. Mechanical means according to claim 5, including a piston carried by said second coupling means, and means for operating said piston to drive it selectively against said flange.

7. In combination with a rotary machine spindle having an end portion within which a shank of a tool holder chuck is releasably secured corotatively with the spindle and a tubular housing part in non-rotary relation about the spindle and having an axial end about said end portion, with a releasing member mounted on the chuck in relatively rotatable relation to the shank and spindle but normally corotative therewith:
    axially facing clutch means carried by said member; and
    complementary axially facing clutch means carried by said housing part end selectively operable to effect clutching interengagement of the clutch means with one another and thereby cause said member to be held for rotation of said shank and spindle relative thereto.

8. A combination according to claim 7, in which said end of said housing part is radially spaced from the end of said spindle for access clearance from a shank-securing device at the end of the spindle, said complementary clutch means including an element arranged to extend axially from said housing part end toward said member-carried clutch means, and means releasably attaching said element to said housing part.

9. In mechanical means enabling operation of a releasing member which is relatively rotatably mounted on a tool holding chuck corotatively supported by a rotary machine spindle:
    first coupling means corotative with said releasing member;

second complementary coupling means normally separated from said first coupling means and operative on being coupled therewith to effect relative rotation between said releasing member and the chuck;

said first coupling means comprising a ferromagnetic flange carried by said releasing member;

means mounting said flange for relative axial movement on said releasing member; and electromagnetic means carried by said complementary coupling means and operative selectively to effect coupling engagement movement of said flange toward and with said second coupling means.

10. In mechanical means enabling operation of a releasing member which is relatively rotatably mounted on a tool holding chuck corotatively supported by a rotary machine spindle:

first coupling means corotative with said releasing member;

second complementary coupling means normally separated from said first coupling means and operative on being coupled therewith to effect relative rotation between said releasing member and the chuck;

said first coupling means comprising a flange carried by said releasing member;

a lost motion connection between said flange and said releasing member; and means for selectively effecting movement of said flange toward and with said second coupling means.

11. In combination with a rotary machine spindle having an end portion within which a shank of a tool holder chuck is releasably secured corotatively with the spindle and a tubular housing part in non-rotary relation about the spindle and having an end about said end portion, with a releasing member mounted on the chuck in relatively rotatable relation to the shank and spindle but normally corotative therewith:

an annular clutch flange carried by said member;

complementary clutch means carried by said housing part end selectively operable to effect clutching interengagement of the clutch means with one another and thereby cause said member to be held for rotation of said shank and spindle relative thereto; and lost motion connecting means between said flange and said member enabling movement of the flange between clutch released and clutch engaged positions;

said complementary clutch means including means for effecting movement of said flange between the clutch released and clutch engaged positions.

12. In combination with a rotary machine spindle having an end portion within which a shank of a tool holder chuck is releasably secured corotatively with the spindle and a tubular housing part in non-rotary relation about the spindle and having an end about said end portion, with a releasing member mounted on the chuck in relatively rotatable relation to the shank and spindle but normally corotative therewith:

clutch means carried by said member; and complementary clutch means carried by said housing part end selectively operable to effect clutching interengagement of the clutch means with one another and thereby cause said member to be held for rotation of said shank and spindle relative thereto;

said complementary clutch means including a piston structure and means for operating the piston structure to actuate said complementary clutch means between clutching and non-clutching relation to said member-carried clutch means.

13. In combination with a rotary machine spindle having an end portion within which a shank of a tool holder chuck is releasably secured corotatively with the spindle and a tubular housing part in non-rotary relation about the spindle and having an end radially spaced from the end portion of the spindle for access clearance relative to a shank-securing device at the end of the spindle, with a releasing member mounted on the chuck in relatively rotatable relation to the shank and spindle but normally corotative therewith:

an annular clutch flange carried by said member;

complementary clutch means carried by said housing part including an element of ring-shape arranged to extend from said housing part toward said member-carried flange; and means releasably attaching said element to said housing part comprising bayonet slot and stud structure enabling quick release and removal of said element for access to said shank securing device.

* * * * *